United States Patent [19]
Bokisch et al.

[11] Patent Number: 5,884,741
[45] Date of Patent: Mar. 23, 1999

[54] FRICTION CLUTCH FOR A MOTOR VEHICLE WITH WEAR ADJUSTMENT

[75] Inventors: Winfried Bokisch, Maibach; Achim Link, Schweinfurt; Reinhold Weidinger, Unterspiesheim, all of Germany

[73] Assignee: Fichtel & Sachs AG, Schweinfurt, Germany

[21] Appl. No.: 826,434

[22] Filed: Mar. 20, 1997

[30] Foreign Application Priority Data

Mar. 21, 1996 [DE] Germany ................ 196 11 100.5

[51] Int. Cl.$^6$ ................................................ F16D 13/75
[52] U.S. Cl. ................................ 192/70.25; 192/111 A
[58] Field of Search .................. 192/70.25, 89.23, 192/111 A

[56] References Cited

U.S. PATENT DOCUMENTS

| | | | |
|---|---|---|---|
| 4,207,972 | 6/1980 | Zeidler .............................. | 192/111 A |
| 4,640,400 | 2/1987 | Nakane et al. ..................... | 192/70.25 |
| 5,320,205 | 6/1994 | Kummer et al. ................... | 192/70.25 |
| 5,377,803 | 1/1995 | Link et al. ......................... | 192/111 A |
| 5,409,091 | 4/1995 | Reik et al. ......................... | 192/70.25 |
| 5,419,418 | 5/1995 | Uenohara et al. .................. | 192/70.25 |
| 5,540,313 | 7/1996 | Weidinger .......................... | 192/70.25 |
| 5,595,274 | 1/1997 | Gochenhour et al. .............. | 192/70.25 |

FOREIGN PATENT DOCUMENTS

| | | |
|---|---|---|
| 0622559 | 11/1994 | European Pat. Off. . |
| 2712051 | 5/1995 | France . |
| 4412107 | 11/1994 | Germany . |
| 4436109 | 1/1996 | Germany . |

OTHER PUBLICATIONS

"Standard Specifications for Springs", German Standards Institution, 4th Edition, 1979, p. 157.

"Constructing in the field of Mechanical Engineering", Munich Technical College, 1957, Dr. G. Niemann.

*Primary Examiner*—Richard M. Lorence
*Attorney, Agent, or Firm*—Nils H. Ljungman & Associates

[57] ABSTRACT

A friction clutch with a mechanism to automatically adjust for the wear of the friction linings by an adjustable-width device. The adjustable-width device includes at least one adjustment element. The adjustment element is centered with respect to the axis of rotation opposite the pressure plate by several guide pins distributed about the circumference of the pressure plate. The guide pins extend axially and support the width of the adjustable element.

22 Claims, 7 Drawing Sheets

FRICTION CLUTCH FOR A MOTOR VEHICLE WITH WEAR ADJUSTMENT

BACKGROUND OF THE INVENTION

1. Field of the Invention

The present invention relates generally to a friction clutch, especially for motor vehicles. The friction clutch can include a counter pressure plate, for example in the form of a flywheel, that can define an axis of rotation. The friction clutch can also include a clutch housing that is mounted to the counter pressure plate, and the friction clutch can include a pressure plate. The pressure plate can be arranged non-rotationally in the clutch housing, but the pressure plate can be axially displaced. The friction clutch can further include means of operation and an energy reservoir. The means of operation and the energy reservoir can be arranged between the clutch housing and the pressure plate, and can tense a clutch plate between the pressure plate and the counter pressure plate. The clutch can also include a mechanism to adjust for the wear of the friction linings. The mechanism can be arranged between the clutch housing, means of operation or energy reservoir, and pressure plate and can include at least one adjustment element. The at least one adjustment element can be arranged substantially concentrically to the axis of rotation and can be designed with circumferential slant surfaces.

2. Background Information

A friction clutch of the above-mentioned construction is known, for example, from published German patent specification 44 12 107. In this known construction, two adjustment elements are guided concentrically to the axis of rotation on the pressure plate on an interior diameter which is formed by a protruding or projecting lug.

OBJECT OF THE INVENTION

The object of the present invention is to design a mechanism for the adjustment of the wear of friction linings in friction clutches of the above-mentioned kind which is simple in construction and easy to operate.

SUMMARY OF THE INVENTION

This object can be accomplished, in accordance with the present invention, by guiding at least one of the adjustment elements in the radial direction by guide pins. The guide pins can be distributed in the circumferential direction and can extend in the axial direction. The guide pins can be fixed to or mounted on a component of the clutch, and the guide pins can be centered with respect to the axis of rotation.

The present invention proposes to guide at least one of the adjustment elements in the radial direction through several guide pins, which guide pins can be distributed on the circumference and run in the axial direction. The guide pins can be mounted or fixed or fastened on a component that is centered opposite to, or with respect to, the axis of rotation. By arranging several, preferably three, guide pins which are preferably distributed on the circumference and run in the axial direction, it can essentially be assured that one or both of the adjustment elements only make contact locally with the guide elements in the form of the guide pins, and that the adjustment mechanism can operate smoothly, even during prolonged operation. In addition, a cutting or metal-removing treatment of the pressure plate, such as in the state of the art, is no longer necessary in this area.

It is further proposed that the energy reservoir can be designed as a membrane spring, that at least one adjustment element can be arranged between the membrane spring and the pressure plate, and that the guide pins can be inserted in the pressure plate. Such a design is relatively simple in construction because the membrane spring can generate counter-pressure, and the membrane spring can also include the transmission elements.

In a relatively simple manner, the guide pins can be arranged on the inner diameter of at least one of the two adjustment elements. Because of the concentric arrangement of the pressure plate in the clutch housing and the arrangement of the guide pins in the pressure plate, one or both of the adjustment elements can be centrally guided through its inner diameter. Even during very high rotation, this type of guidance can essentially assure that the torsion mobility of the adjustment elements can always be maintained.

It is also relatively easy, however, to arrange the guide pins on the outside diameter of at least one of the adjustment elements. Upon occurrence of high centrifugal forces, such a construction can protect the adjustment elements from deformation.

Another variant provides that the guide pins are preferably arranged alternately on the outside diameter and the inside diameter of at least one of the adjustment elements. Although such a guidance can have more points of contact between the guide pins and the adjustment elements, this variant embodiment can still provide an especially effective guidance of the adjustment elements.

Another proposal of the present invention provides two axially successively arranged adjustment elements, whereby the two adjustment elements are braced against each other to support each other, or are mutually braced with one another, by at least one spring element on their circumference. The use of two adjustments elements with corresponding slant faces with mutual resilience can enable a relatively simple working of the pressure plate. In the area of contact between the pressure plate and the adjustment element assigned to the pressure plate, a circumferential contact area which can run vertically to the axis of rotation can be sufficient. The mounting and the position of the two adjustment elements with respect to the pressure plate can essentially be not critical, because at least one spring element can be effective only between the two adjustment elements.

It is also possible, however, to provide at least one spring element. One end of the spring element can be fastened to the pressure plate, and the other end of the spring element can be fastened to the appropriate adjustment element. However, if two adjustment elements are used, the unstressed one preferably must be stopped in the circumferential direction. This can be achieved, for example, with the membrane spring or also by a clearance sensor.

The one or both spring elements can advantageously be designed as spring tension coils. The spring elements can be arranged tangentially in the inner diameter of the adjustment element or elements, whereby one end of a spring element can be hooked into an opening in the adjustment elements, and the other end of a spring element can be hooked into the guide pins which run along the inner diameter. On the one hand, this can enable a relatively cost-efficient production of the spring, and on the other hand, at least some of the individual guide pins can also additionally be used to support the resilience or springiness or spring resistance.

In doing so, the other end of the spring can preferably be designed as an open hook, which open hook can run on a level that is approximately parallel to the membrane spring, in a gap between the pressure plate and the adjustment element. This can provide a space-saving storage for a spring which can be manufactured quite simply.

It is also possible, however, to design the other end of the spring as a spring coil. The spring coil can run parallel to the axis of rotation, and the spring coil can be turned over the corresponding guide pin and preferably support the adjustment element or elements. In doing so, it must be taken into account that the appropriate guide pin can be radially offset or staggered toward the inside by the size of the material strength of the spring. In other words, the guide pins can be offset toward the axis of rotation to a degree which can correspond to the spring constant of the spring. Such an embodiment of the spring can also be manufactured in a very simple manner and can require essentially no additional space for the projecting end of the spring.

It is furthermore provided that the guide pins and/or adjustment elements can be designed to resist corrosion. This preferably serves the friction-free or flawless or smooth movement of all components throughout the entire life span of the friction clutch. In making the elements corrosion resistant, the actual guide pins and/or adjustment elements can be made of corrosion-resistant material, or can be coated with such a material.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are explained in greater detail below with reference to the accompanying drawings, in which.

DESCRIPTION OF THE PREFERRED EMBODIMENT

Figure 1:
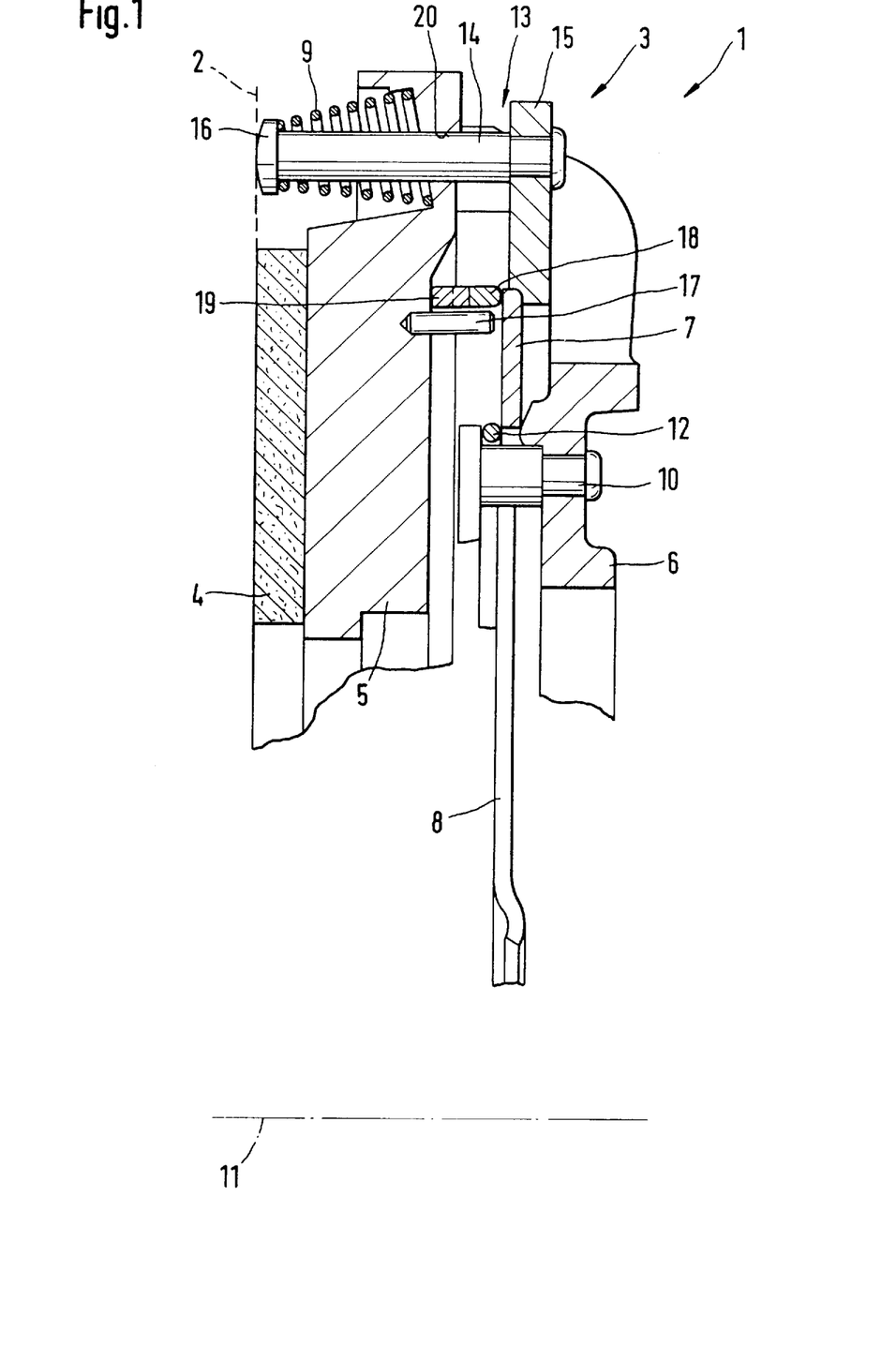
FIG. 1 shows the upper half of a longitudinal section through a friction clutch.

FIG. 1 shows a so-called pressed membrane spring clutch 1 or friction clutch with automatic wear adjustment. A clutch housing 6 can be solidly affixed to a counter pressure plate 2, (the outline of which is shown in dotted lines) for example in the form of a flywheel. Arranged in the clutch housing 6 can be a pressure plate 5, which pressure plate 5 can be non-rotationally connected to the clutch housing 6, but can be axially displaced (for example, by tangential plate springs). Arranged between the pressure plate 5 and the clutch housing 6 can be a membrane spring 7, which membrane spring 7 can be tiltably positioned on a center diameter on the clutch housing 6 with several spacer bolts 10 distributed on the circumference, for example, with interposition of a wire ring 12.

Radially inside, or in other words towards an axis of rotation 11, the membrane spring 7 can have spring tongues 8 which spring tongues 8 can be designed to engage on a disengagement system (not shown). All components of the friction clutch 1 can run, or in other words, rotate with the counter pressure plate or flywheel 2 around the joint axis of rotation 11. Between the counter pressure plate 2 and pressure plate 5, a clutch disc with friction linings 4 can be tensed to transmit the moment of torsion from the counter pressure plate 2 to an input gear shaft (not shown), which input gear shaft can run concentrically to the axis of rotation 11.

The friction clutch 1 can have a mechanism 3 for the automatic wear adjustment. For this purpose, one of several clearance sensors 13 can be provided, which clearance sensors 13 can be distributed on the circumference, or distributed circumferentially, as for example, about the pressure plate 5. Each of the clearance sensors 13 can preferably include a slide pin 14 that can run substantially parallel to the axis of rotation 11 in an opening 20 of pressure plate 5. Each clearance sensor 13 can also include a lever 15, which lever 15 can be solidly fastened-to the slide pin 14 and can run radially toward the inside in such a manner that it (lever 15) either rests on the side of membrane spring 7 which faces away from the pressure plate 5, or, in a possible embodiment, on the side of one of the adjustment elements 18, 19 which can face away from the pressure plate 5.

Figure 2A:
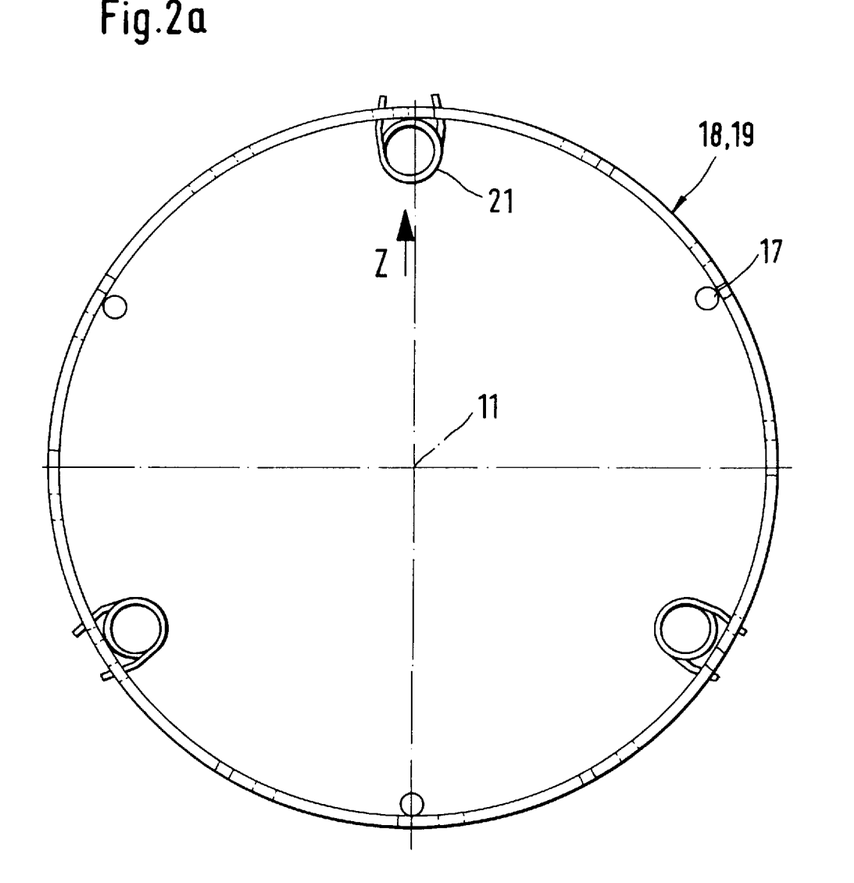
FIGS. 2a and 2b show a view and partial view Z of the adjustment elements.
Figure 2B:
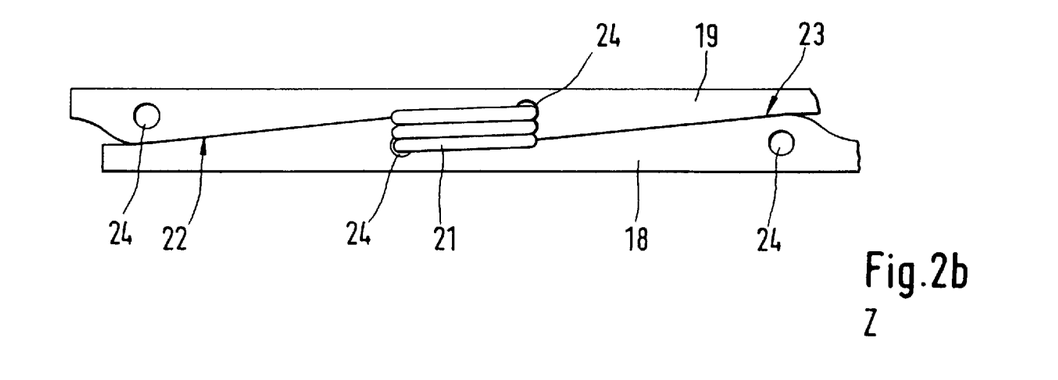

In the embodiment shown in FIGS. 2a and 2b, two axially successively positioned adjustment elements 18, 19 are preferably provided. One adjustment element 19 can be directly supported by the pressure plate 5, and the other adjustment element 18 can be supported by the membrane spring 7. Both adjustment elements 18, 19 can be designed as ring-shaped or annular bodies, and can have several adjusting surfaces or slant faces 22, 23. The slant faces 22, 23 can be distributed on the circumference in the opposite areas. In other words, the adjustment surfaces or slant faces 22, 23 can be disposed opposite or facing each other. Furthermore, a resilience or spring resistance or force or spring can act between the two adjustment elements 18, 19 in such a manner that both adjustment elements 18, 19 can be mutually tensed on their circumference and seek to increase their axial extension through a circumferential apparent movement and through rising on the slant faces 22 and 23.

For the embodiment shown, several torsion springs 21 can be distributed on the circumference, and the torsion springs 21 can engage in appropriate openings 24 of the two adjustment elements 18, 19. Both adjustment elements 18, 19 can run in the radial direction and can be centered with respect to pressure plate 5 by means of several guide pins 17. The guide pins 17 can be distributed on the circumference of pressure plate 5, and the guide pins 17 can be preferably inserted in pressure plate 5, and can run parallel to the axis of rotation 11.

Furthermore, each sliding bolt 14 can have a coil spring 9, whereby the coil spring 9 is on the one hand supported by the pressure plate 5, and on the other hand by a head 16 of sliding bolt 14, which coil spring 9 can tense the same in the direction of the counter pressure plate 2. The coil spring 9 can also be arranged in such a manner that the coil spring 9 can exert a moment on sliding bolt 14 to clamp the sane into the opening 20 of pressure plate 5.

With respect to the general function, reference is made again to the known clutch in the form of Federal Republic of Germany published patent specification 44 12 107, which is hereby incorporated by reference herein, as if set forth in its entirety herein. Another description of the general function of the adjustment elements 18, 19 and the clearance sensor 13 can also be found in U.S. Pat. No. 5,540,313 assigned to the assignee of the present invention, said U.S. Pat. No. 5,540,313 herein incorporated by reference.

Contrary to that known device, however, the present construction solves the guidance of the two adjustment elements 18 and 19 in such a manner that preferably several guide pins 17 distributed on the circumference can be arranged parallel to the axis of rotation 11 in the pressure plate 5. These guide pins 17 can achieve the radial fixation of the adjustment elements 18 and 19. In doing so, for a possible embodiment, a total of three guide pins 17 can be advantageous. The guide pins 17 can be advantageously arranged radially inside of or nearer to the axis of rotation 11 than the adjustment elements 18 and 19. This can result in less tolerance problems, and it is preferably not necessary to maintain a continuous forced contact between the adjustment elements 18, 19 and the guide pins 17. In any case, the contact at the contact points can be limited to lines, which can result in a relatively low-friction adjustment movement during the automatic adjustment.

In other words, and in accordance with one possible embodiment, because each of the pins or guide pins 17 can be a cylindrically shaped member or elongation, each of the guide pins 17 can have a curved outer surface. Each of the inner and outer radial surfaces of each of the adjustment elements 18 and 19 can also be preferably curved surfaces having a substantially greater radius of curvature than each of the outer surfaces of the guide pins 17. Therefore, contact between each of the guide pins 17 and either the inner and outer surfaces of each of the adjustment elements 18 and 19 can be limited to essentially a line extending substantially parallel with the axis of rotation 11, rather than a relatively substantial portion of the surface of each guide pin 17.

To maintain the low-friction adjustment during prolonged operation as well, it can be advantageous to design the guide pins 17 and/or adjustment elements 18, 19 to be corrosion-resistant, or to be formed from corrosion-inhibiting materials, or to be coated with corrosion-inhibiting materials. In doing so, it may be sufficient to treat one of the components with a wear-resistant coating or a rust-protection coating, but it is also possible to manufacture at least some of these parts preferably from an essentially rust-proof material.

Figure 3:
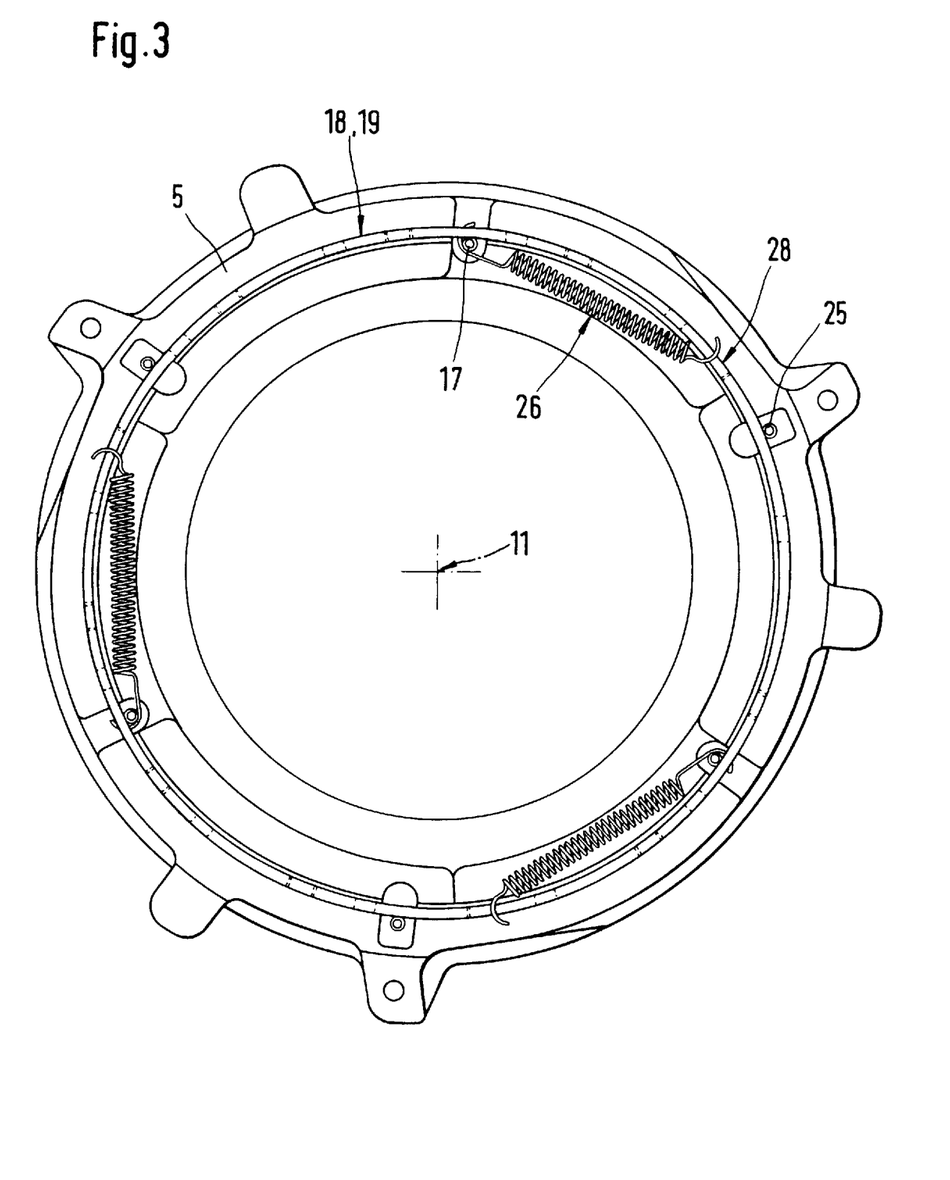
FIG. 3 shows a view of the pressure plate with adjustment element and springs from the direction of the membrane spring.

FIG. 3 shows a view of the pressure plate 5 from the side of the membrane spring 7. One or both of the adjustment elements 18, 19 can be arranged concentrically to the axis of rotation 11, and in the embodiment shown, the adjustment elements 18, 19 can be fixated by three radial inner guide pins 17 and three radial outer guide pins 25. Both types of guide pins 17, 25 can be circumferentially offset and thus the adjustment element or elements 18, 19 can be evenly guided radially toward the outside and the inside. Furthermore, three spring tension coils 26 can be distributed on the circumference, and one end of each of the spring tension coils 26 can be hooked into an opening 28, while the other end of each of the spring tension coils 26 can be hooked into one of the guide pins 17. The guide pins 17 can be located radially inside of the adjustment elements 18, 19.

Figures 4A, 4B:
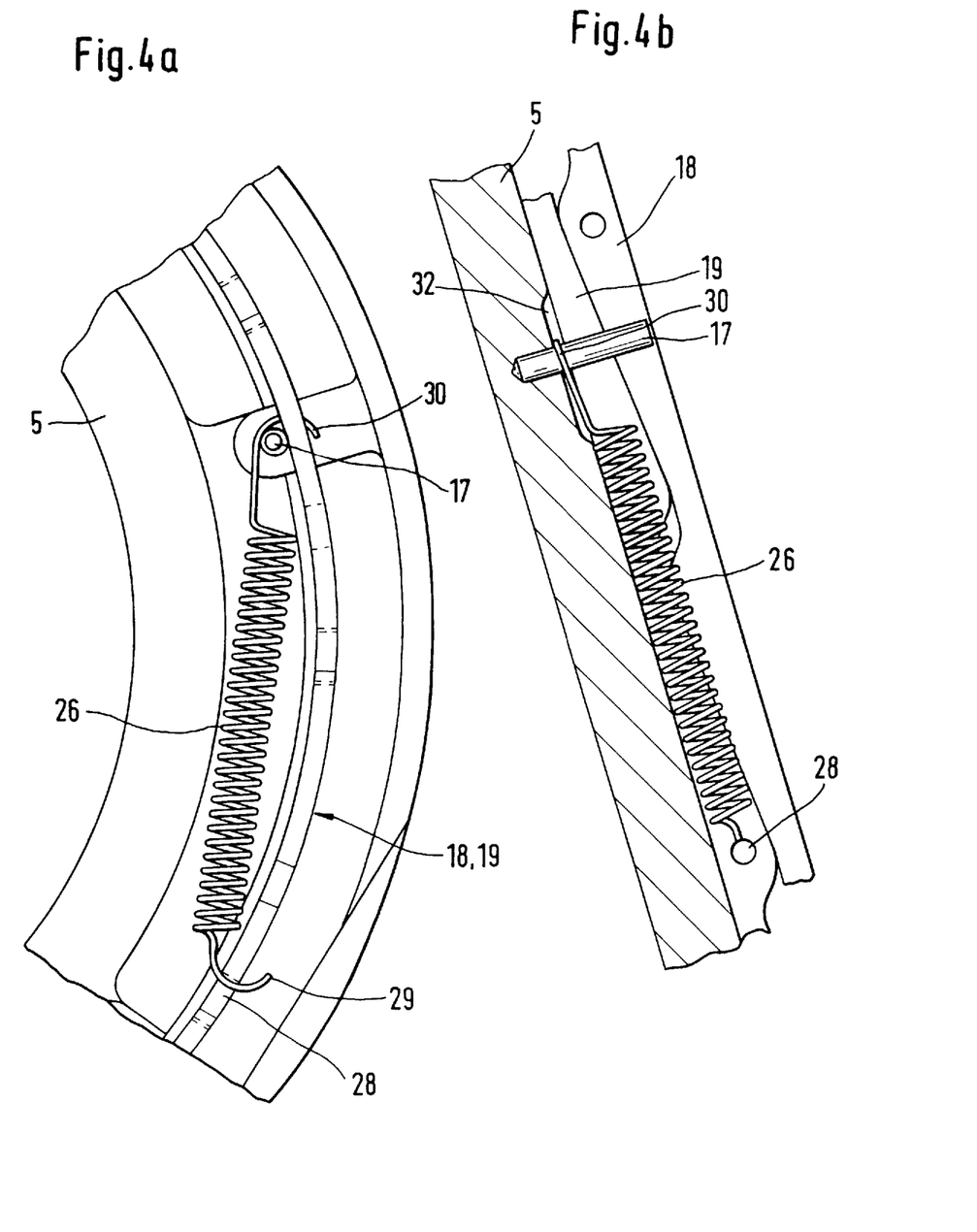
FIGS. 4a and 4b show a partial view in the axial and radial directions of a spring and an embodiment of the adjustment elements.

One end 29 of the spring tension coil 26 can be hooked into an opening 28 in adjustment element 19, as is particularly shown by the enlarged representation of a partial view in the axial direction and in the radial direction in FIGS. 4a and 4b. The other end 30 of each of the springs 26 can be hooked on a corresponding guide pin 17, which guide pins 17 can guide the adjustment elements 18, 19 radially toward the inside. In order to hook the other end 30 into the guide pin 17 without difficulty, the embodiment shown there can provide a gap 32 between the adjustment element 19 and the pressure plate 5. This gap 32 may be alternately arranged, for other possible embodiments, in adjustment element 19 or in pressure plate 5. In the present case, the gap 32 is preferably directly included in pressure plate 5. As the radial view from the inside shows, the spring tension coil 26 can be hooked into the adjustment element 19, which adjustment element 19 can rest directly on the pressure plate 5.

It can therefore be necessary that the other adjustment element 18, which other adjustment element 18 can be directly tensed by the pressure plate 5, can be arrested in the circumferential direction. This can be achieved, in a possible embodiment of the present invention, by the lever 15 of the clearance sensor 13, which lever 15 can engage in an appropriate recess of the adjustment element 18.

In other words, for a possible embodiment, the spring tension coil 26 can be extended between and connected to the adjustment element 19 and the pressure plate 5. The spring tension coil 26 can be connected to urge the adjustment element 19 to rotate about the rotational axis 11 with respect to the pressure plate 5 upon wear of the friction lining 4. However, a relative rotation between the adjustment element 19 and the adjustable element 18 can also be necessary to cause a relative displacement along the adjusting surfaces or slant faces 22 and 23, to thereby cause an increase in the axial width or axial extension of the two adjustment elements 18 and 19 together.

To permit a relative rotation of the adjustment element 18 with respect to the adjustment element 19 upon a relative rotation of the adjustment element 19 with respect to the pressure plate 5, the adjustment element 18 can, for a possible embodiment of the present invention, essentially be fixed against relative rotation between itself, the adjustment element 18, and the pressure plate 5. Thus, a relative rotation of the adjustment element 19 with respect to the pressure plate 5 caused by the urging or biasing of the spring tension coil 26 can also cause a relative rotation of the adjustment element 19 with respect to the adjustment element 18 to thereby compensate for the wear of the friction lining 4.

Figure 4C:
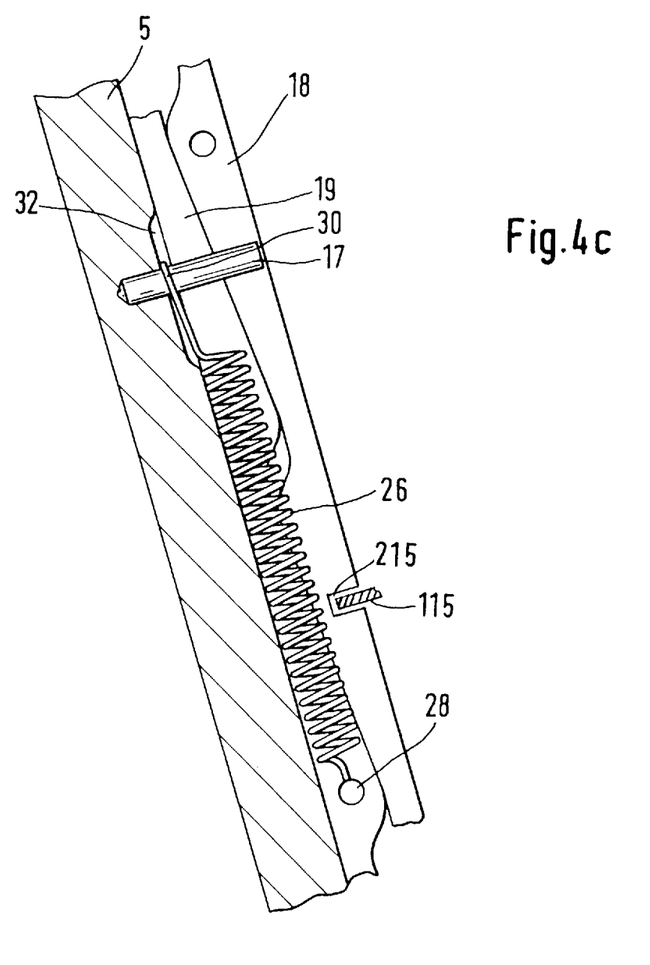
FIG. 4c shows a possible embodiment of the adjustment elements.

As shown in FIG. 4c for a possible embodiment of the present invention, to prevent relative rotation between the pressure plate 5 and the adjustment element 18, the lever 15 can include an extension 115. The extension 115 can engage, without substantial circumferential play, a slot 215 formed in the adjustment element 18. Because the lever 15 and the pressure plate 5 are preferably non-rotatably connected, the engagement of the extension 115 with the slot 215 can prevent relative rotation of the adjustment element 18 with respect to the pressure plate 5.

Figures 5A, 5B:
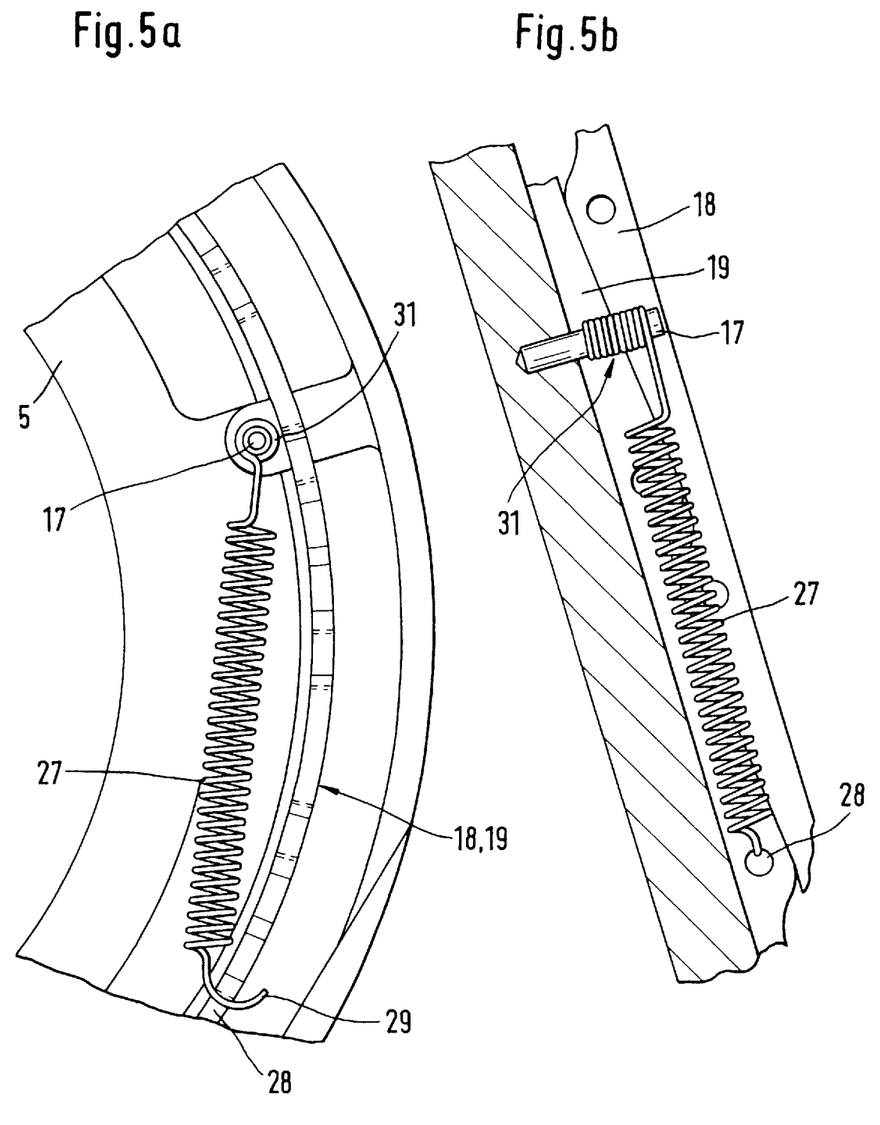
FIGS. 5a and 5b show a partial view in the axial and radial directions of another spring and embodiment of the adjustment elements.

FIGS. 5a and 5b also show an enlarged representation of a partial view in the axial direction and in the radial direction. One end 29 of the spring tension coil 27 preferably used in the embodiment shown can be hooked in an opening 28 of the adjustment element 19, which adjustment element 19 can be positioned inside. The other end 31 of the spring tension coil 27 can be formed as a spring coil, which spring coil can run substantially parallel to the axis of rotation 11, is preferably ineffective as a spring coil, and can be turned over the outer diameter of the guide pin 17. In doing so, this corresponding guide pin 17 can be offset radially toward the inside by the material strength of spring tension coil 27 so that the two adjustment elements 18 and 19 are preferably guided on the outer diameter of this spring coil. This construction can substantially eliminate the requirement to provide a separate space for the projecting spring end. In addition, the construction can make it relatively easier to mount the spring tension coil 27.

In other words, for a possible embodiment, the end 31 of the spring tension coil 27 can be located on the corresponding guide pin 17. Locating the end 31 of the spring tension coil 27 on the guide pin 17 can preferably eliminate the need for a corresponding notch or hole (as for example, corresponding to hole or recess or notch 33) to be formed in the adjustment element 19 to locate the end 31 of the spring tension coil 27. As shown in FIGS. 5a and 5b, the end 31 of the spring tension coil 27 can be formed by one or more substantially circular turns of coils, similar in shape to a spring coil or torsion coil. However, the end 31 formed in the shape of a spring coil or torsion coil preferably does not need operatively act as a spring coil or torsion coil, but instead can perform the function of locating the end 31 of the spring tension coil 27 to the guide pin 17 via a male (the guide pin 17) and female (the end 31) connection.

Because the circular turns of the end 31 of the spring tension coil 27 can extend along the axial extension of the guide pin 17 from the pressure plate 5, the adjusting elements 18 and 19 can preferably be supported against or contact the outer surface of the circular turns of the end 31 of the spring tension coil 27, rather than being supported against or contacting the outer surface of the corresponding guide pin 17 directly. Accordingly, the radial location of the guide pin 17 can, for the embodiment shown in FIG. 5, be shifted radially inward towards the axis of rotation 11 to compensate for the thickness of a wire used to manufacture the spring tension coil 27.

As shown in FIGS. 3, 4a, 4b, 5a and 5b, it can be advantageous to load the adjustment element 19, which adjustment element 19 is preferably not in direct contact with the membrane spring 7, by the spring tension coils 26, 27 in the direction of the circumference. In doing so, the springs 26, 27 preferably may slightly deform the adjustment element 19 so that there is no longer a precise ring shape. This, however, is not critical at this particular location, because the front adjustment element 18 is preferably in contact with the membrane spring 7, and the same (membrane spring 7) is preferably not subject to the deformation.

In other words, for a possible embodiment, the force applied by the spring tension coils 26 and 27 to the corresponding adjustment elements 18 and 19 can cause localized bending or deformation of the corresponding adjustment element 18 and 19. If this localized deformation were to occur in or substantially close to an area contacting or supporting the membrane spring 7, the membrane spring 7 could itself at least partially deform in response to the localized deformation of the corresponding adjustment element 18 and 19. This deformation of the membrane spring 7 can be undesirable, because it can change the force generated by the membrane spring 7.

Therefore, in possible embodiments of the present invention, it can be preferable to attach the spring tension coils 26 and 27 to the adjustment element 19 located adjacent the pressure plate 5. Localized deformation of the adjustment element 19 can, in effect, take place without a resulting deformation of the adjustment element 18 adjacent the membrane spring 7. The membrane spring 7 can thereby be substantially isolated from any localized deformation of the adjustment element 19.

Figure 6A:
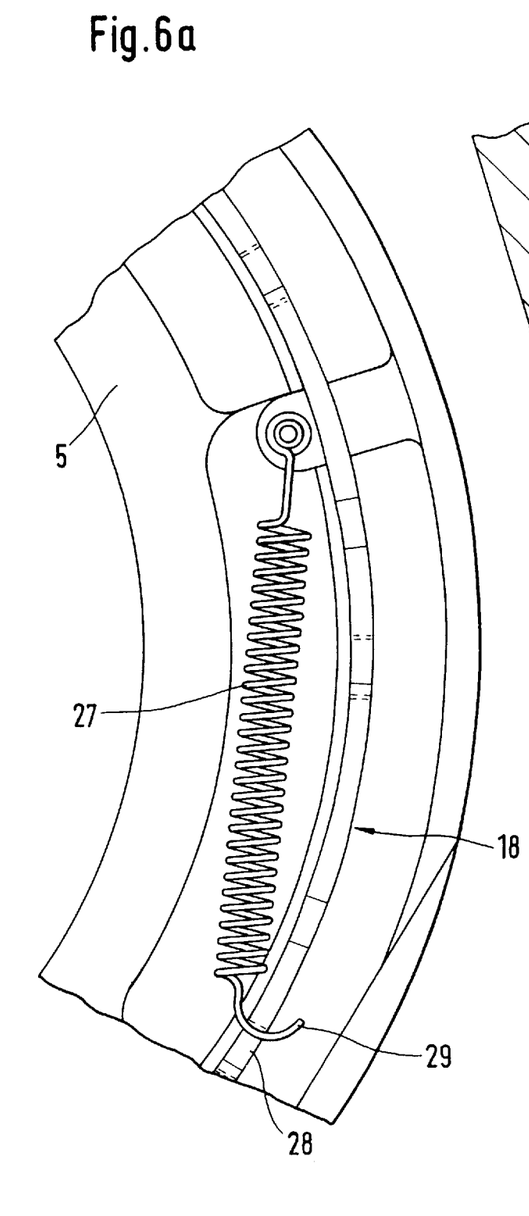
FIGS. 6a and 6b show a partial view in the axial and radial directions of another spring and embodiment of the adjustment elements.
Figure 6B:
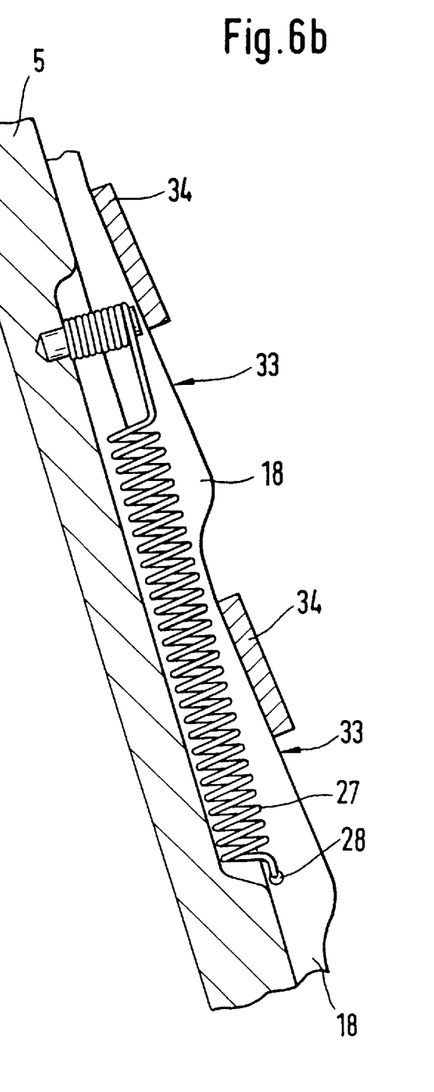

FIGS. 6a and 6b show the arrangement of a single adjustment element 18. The adjustment element 18 can rest on the pressure plate 5 with a level surface, and the adjustment element 18 can have several slant faces 33 in the direction of the membrane spring 7. These slant faces 33 can be located on individual circumferentially spaced areas 34 of membrane spring 7. The areas 34 can have the same incline as the slant faces 33. This construction can be relatively easy to construct because the second adjustment element can be omitted without substitution. The embodiment and effect of spring tension coil 27 is already known from FIGS. 5a and 5b.

It should also be noted that the used membrane spring 7 can be used, for possible embodiments of the present invention, in pressed as well as in depressed construction.

In other words, it is conceivable that embodiments of the present invention can be employed with both pushed or pushed-type clutches (wherein the spring tongues 8 of the membrane spring 7, or equivalent structures, can be pushed towards the friction linings 4 to release or disengage the clutch as shown in FIG. 1) and pulled or pulled-type clutches (wherein the spring tongues 8 of the membrane spring 7, or equivalent structures, can be pulled away from the friction linings 4 to release or disengage the clutch). An example of a pulled-type clutch could be disclosed by the following U.S. Patent, assigned to the assignee of the present invention U.S. Pat. No. 4,871,050, said patent being herein incorporated by reference.

One feature of the invention resides broadly in the friction clutch, especially for motor vehicles, comprising a counter pressure plate, for example in form of a flywheel, which defines an axis of rotation; a clutch housing or crankshaft which is mounted to the counter pressure plate; a pressure plate which is arranged non-rotationally inside the clutch housing, but can be axially displaced; means of operation and energy reservoir, which are arranged between clutch housing and pressure plate and can clamp or grip or mount a clutch plate between the pressure plate and the counter pressure plate; a mechanism to adjust for wear of the friction linings which is arranged between clutch housing, means of operation or energy reservoir, and pressure plate, and comprises at least one adjustment element which is arranged concentrically in relation to the axis of rotation and designed with circumferential slant faces characterized in that at least one of the adjustment elements 18, 19 is guided in radial direction through several guide pins 17, 25 which are distributed at the circumference and run in axial direction, said guide pins are mounted or solidly arranged on a component 5 which is centered opposite or with respect to the axis of rotation 11.

Another feature of the invention resides broadly in the friction clutch characterized in that the energy reservoir is designed as a membrane spring element 7, that at least one of the adjustment elements 18, 19 is arranged between the membrane spring element 7 and the pressure plate 5, and that the guide pins 17, 25 are inserted in the pressure plate.

Yet another feature of the invention resides broadly in the friction clutch characterized in that the guide pins 17 are arranged at the inner diameter of at least one of the adjustment elements 18, 19.

Still another feature of the invention resides broadly in the friction clutch characterized in that the guide pins 25 are arranged on the outer diameter of at least one of the adjustment elements 18, 19.

A further feature of the invention resides broadly in the friction clutch characterized in that the guide pins 17, 25 are arranged alternately on the outer diameter and the inner diameter of at least one of the adjustment elements 18, 19.

Another feature of the invention resides broadly in the friction clutch characterized in that when two successively arranged axial adjustment elements 18, 19 are used, the adjustment elements 18, 19 are braced against each other on their facing circumferences by at least one spring element 21.

Yet another feature of the invention resides broadly in the friction clutch characterized in that when an adjustment element 18 is used, said adjustment element or, when two adjustment elements 18, 19 are used, at least one of the two is tensed by at least one spring element 26, 27 against the pressure plate 5 in circumferential direction, and that the other adjustment element is arrested or in other words locked or stopped on the circumference.

Still another feature of the invention resides broadly in the friction clutch characterized in that the spring element is designed as a spring tension coil 26, 27 and runs tangentially in the inner diameter of one or both of the adjustment elements 18, 19, and that one of the ends 29 of said spring tension coil is hooked into an opening 28 in the adjustment element, and the other end 30 is hooked into one of the guide pins 17 which run along the inner diameter.

A further feature of the invention resides broadly in the friction clutch characterized in that the other end 30 is designed as an open hook and runs on a plane approximately parallel to the membrane spring 7 in a gap 32 between the pressure plate 5 and the adjustment element 19.

Another feature of the invention resides broadly in the friction clutch characterized in that the other end 31 is designed as a spring coil which runs parallel to the axis of rotation 11 which is turned over the appropriate guide pin 17 and supports one or both of the adjustment elements 18, 19.

Yet another feature of the invention resides broadly in the friction clutch characterized in that the guide pins 17, 25 and/or adjustment devices 18, 19 are designed to inhibit corrosion.

The following U.S. patent applications Ser. No. 08/606416, filed Feb. 23, 1996, titled "Motor Vehicle Friction Clutch with Automatic Wear Adjustment", attorney docket no. NHL-FIS-172(FIS-61)-CIP, corresponding to Federal Republic of Germany Patent Application no. P 43 37 613 and 195 06 698, having inventors Achim Link and Reinhold Weidinger; Ser. No. 08/720489, filed Sep. 30, 1996, titled "Friction Clutch for a Motor Vehicle Transmission and a Friction Clutch Having Automatic Adjustment for Wear", attorney docket no. NHL-FIS-61-C, corresponding to Federal Republic of Germany Patent Application no. P 43 37 613, having inventors Achim Link, Reinhold Weidinger, Heiko Schulz-Andres, Klaus Elsner, Rainer Weidmann, Ralph Nenninger and Michael Weiss; Ser. No. 08/555770, filed Nov. 9, 1995, titled "Friction Clutch with Automatic Wear Compensation", attorney docket no. NHL-FIS-154, corresponding to Federal Republic of Germany Application no. P 44 40 412, having the inventor Reinhold Weidinger; Ser. No. 08/541829, filed Oct. 10, 1995, attorney docket no. NHL-FIS-140, titled "Pulled-Type Membrane Spring Clutch with Wear Adjustment Mechanism", corresponding to Federal Republic of Germany Application no. P 44 36 110, having the inventors Reinhold Weidinger and Jorg Sudau; Ser. No. 08/541628, filed Oct. 10, 1995, attorney docket no. NHL-FIS-141, titled "Friction Clutch with Adjustment for Wear", corresponding to Federal Republic of Germany Application no. P 44 36 111, having the inventor Reinhold Weidinger; and Ser. No. 08/816,732, filed concurrently or nearly concurrently with the present application, attorney docket no. NHL-FIS-269, titled "Motor Vehicle Friction Clutch with Automatic Wear Adjustment", corresponding to Federal Republic of Germany Patent Application no. 196 10 427.0 filed Mar. 16, 1996, having the inventors Michael Weiss and Reinhold weidinger, which may contain components which may be incorporated into embodiments of the present invention, are hereby incorporated by reference as if set forth in their entirety herein.

Other examples of clutch components which may be incorporated into embodiments of the present invention, or which components could be adapted for use in the context of the present invention, could be disclosed by the following U.S. Patents, each of which are assigned to the assignee of the present invention U.S. Pat. No. 5,579,881, U.S. Pat. No. 5,560,463, U.S. Pat. No. 5,540,313, U.S. Pat. No. 5,377,803 and U.S. Pat. No. 4,871,050.

Still other examples of clutch components which may be incorporated into embodiments of the present invention, or which components could be adapted for use in the context of the present invention, could be disclosed by the following U.S. Patents: U.S. Pat. No. 5,509,518, U.S. Pat. No. 5,450, 934, U.S. Pat. No. 5,409,091, U.S. Pat. No. 5,404,979 and U.S. Pat. No. 5,320,205.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 11 100.5, filed on Mar. 21, 1996, having inventors Winfried Bokisch, Achim Link, and Reinhold Weidinger, and DE-OS 196 11 100.5 and DE-PS 196 11 100.5, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch with automatic wear compensation for a motor vehicle, said friction clutch comprising:

a clutch housing;

said clutch housing being configured to be non-rotatably connected to a flywheel to rotate with a flywheel about an axis of rotation;

a clutch disc;

a pressure plate to apply an axially directed force to said clutch disc to engage said clutch disc with a flywheel;

said pressure plate having a first side and a second side;

said first side of said pressure plate being disposed adjacent said clutch disc;

said pressure plate being non-rotationally connected to said clutch housing;

said clutch disc being configured to be disposed between a flywheel and said pressure plate;

said clutch disc comprising a friction lining;

an energy storage device being disposed between said clutch housing and said pressure plate to generate an axially directed force to engage said clutch disc with a flywheel;

a wear adjustment mechanism being disposed between said clutch housing and said pressure plate;

said wear adjustment mechanism comprising two ring-shaped members;

said wear adjustment mechanism comprising a plurality of pin members;

said plurality of pin members being elongated;

said elongated pin members having longitudinal axes;

the longitudinal axes of said plurality of pin members being disposed substantially parallel with the axis of rotation;

said plurality of pin members being disposed adjacent and substantially in the same radial proximity to both of said two ring-shaped members; and said plurality of pin members being disposed to simultaneously position both of said two ring-shaped members substantially concentrically about the axis of rotation.

2. The friction clutch according to claim 1, wherein:

said two ring-shaped members are disposed axially adjacent one another;

each of said two ring-shaped members has an inner radial diameter dimension and an outer radial diameter dimension relative to said axis of rotation;

both of the inner radial diameter dimensions are substantially equal to one another; and both of the outer radial diameter dimensions are substantially equal to one another.

3. The friction clutch according to claim 2, wherein said plurality of pin members are configured and disposed to continuously simultaneously position both of said two ring-shaped members substantially concentrically about the axis of rotation upon wear of said clutch.

4. The friction clutch according to claim 3, wherein:

said plurality of pin members comprises a plurality of pins; and each of said plurality of pins is substantially cylindrically shaped.

5. The friction clutch according to claim 4, wherein each of said plurality of pins is attached to said pressure plate.

6. The friction clutch according to claim 5, wherein:

said energy storage device comprises a membrane spring; and said membrane spring is disposed between said pressure plate and said clutch housing.

7. The friction clutch according to claim 6, wherein said two ring-shaped members are disposed between said membrane spring and said pressure plate.

8. The friction clutch according to claim 7, wherein:

said two ring-shaped members comprise an inner surface and an outer surface;

each of said inner and outer surfaces of said two ring-shaped members extend substantially parallel to the axis of rotation;

said outer surface of said two ring-shaped members is disposed radially outward from said inner surface of said two ring-shaped members;

said plurality of pins comprises one of the following A), B) and C):

A) each of said plurality of pins is disposed adjacent said outer surface of said two ring-shaped members; and each of said plurality of pins is disposed radially outward of said outer surface of said two ring-shaped members; and B) each of said plurality of pins is disposed adjacent said inner surface of said two ring-shaped members; and each of said plurality of pins is disposed radially inward of said inner surface of said two ring-shaped members; and C) said plurality of pins comprises at least one outer pin;

said at least one outer pin is disposed adjacent said outer surface of said two ring-shaped members;

said at least one outer pin is disposed radially outward of said outer surface of said two ring-shaped members;

said plurality of pins comprises at least one inner pin;

said at least one inner pin is disposed adjacent said inner surface of said two ring-shaped members; and said at least one inner pin is disposed radially inward of said inner surface of said two ring-shaped members.

9. The friction clutch according to claim 8, wherein:

at least one of said plurality of pins comprises a first material;

said two ring-shaped members comprise a second material; and at least one of said first material and said second material comprises a corrosion-inhibiting material to substantially inhibit corrosion of at least a portion of said wear adjustment mechanism.

10. The friction clutch according to claim 8, wherein:

said two ring-shaped members comprise a first ring-shaped member and a second ring-shaped member;

said first ring-shaped member comprises at least one adjustment surface;

said second ring-shaped member comprises at least one additional adjustment surface;

said first and second ring-shaped members are disposed immediately adjacent to each another;

said at least one adjustment surface of said first ring-shaped member and said at least one additional adjustment surface of said second ring-shaped member extend circumferentially about the axis of rotation;

said two ring-shaped members together have a width defined substantially parallel with the axis of rotation; and said at least one adjustment surface of said first ring-shaped member is disposed to cooperatively contact said at least one additional adjustment surface of said second ring-shaped member to permit an increase in said width of said two ring-shaped members upon a relative rotation of said first ring-shaped member with respect to said second ring-shaped member.

11. The friction clutch according to claim 10, wherein:

said first and second ring-shaped members are disposed immediately adjacent to one another;

each of said first and second ring-shaped members are disposed substantially coaxially with respect to one another;

said first ring-shaped member is disposed between said membrane spring and said second ring-shaped member; and said second ring-shaped member is disposed between said pressure plate and said first ring-shaped member.

12. The friction clutch according to claim 11, wherein said wear adjustment mechanism comprises at least one spring;

said at least one spring of said wear adjustment mechanism extends between and connects said first ring-shaped member and said second ring-shaped member; and said at least one spring of said wear adjustment mechanism is disposed to urge said first and second ring-shaped members to rotate about the axis of rotation relative to one another and increase said width of said first and second ring-shaped members upon wear of said friction linings.

13. The friction clutch according to claim 11, wherein:

said wear adjustment mechanism comprises at least one spring;

said at least one spring of said wear adjustment mechanism extends between and connects said pressure plate and one of said first and second ring-shaped members;

said at least one spring of said wear adjustment mechanism is disposed to urge said one of said first and second ring-shaped members to rotate about the axis of rotation relative to said pressure plate to increase said width of said first and second ring-shaped members upon wear of said friction linings; and the other of said one of said first and second ring-shaped members is non-rotatably connected to said pressure plate to prevent relative rotation of one another about the axis of rotation.

14. The friction clutch according to claim 13, wherein:

said at least one spring of said wear adjustment mechanism has a longitudinal axis;

said at least one spring of said wear adjustment mechanism comprises a first end portion and an axially opposite second end portion;

said at least one spring of said wear adjustment mechanism comprises an intermediate portion;

said intermediate portion of said at least one spring is disposed between said first and second end portions of said at least one spring;

said one of said first and second ring-shaped members comprises a hole;

said hole extends between said inner surface and said outer surface of said one of said first and second ring-shaped members;

said first end portion of said at least one spring is hook-shaped;

said first end portion of said at least one spring extends through said hole to hook said first end portion of said at least one spring to said one of said first and second ring-shaped members;

said second end portion of said at least one spring is attached to a corresponding one of said plurality of pins; and said intermediate portion of said at least one spring is disposed radially inward of said inner surface of said one of said first and second ring-shaped members.

15. The friction clutch according to claim 14, wherein:

said wear adjustment mechanism further comprises one of the following sets of characteristics D), E) and F)

D) said plurality of pins comprises one of B) and C);

said corresponding pin to which said second end portion of said at least one spring is attached is disposed radially inward of said inner surface of said one of said first and second ring-shaped members;

said second end portion of said at least one spring comprises a plurality of coils;

said plurality of coils is disposed about said corresponding pin to attach said second end portion of said at least one spring to said corresponding pin; and said plurality of coils is disposed to support at least one of said first ring-shaped member and said second ring-shaped member; and E) said plurality of pins comprises one of B) and C);

said corresponding pin to which said second end portion of said at least one spring is attached is disposed radially inward of said inner surface of said one of said first and second ring-shaped members;

said second end portion of said at least one spring is hook-shaped; and said second end portion of said at least one spring is hooked to said corresponding pin; and F) at least one of said first ring-shaped member and said pressure plate comprises a portion disposed to define a gap between said pressure plate and said first ring-shaped member;

said gap having a width dimension defined substantially parallel with the axis of rotation;

said corresponding pin comprises a portion disposed to extend through said gap;

said second end portion of said at least one spring is hook-shaped;

said second end portion of said at least one spring is disposed in said gap;

said second end portion of said at least one spring is disposed approximately parallel with said membrane spring; and said second end portion of said at least one spring is hooked to said portion of said corresponding pin.

16. The friction clutch according to claim 11 wherein said plurality of pin members comprises a plurality of pins;

each of said plurality of pins is substantially cylindrically shaped;

each of said plurality of pins is attached to said pressure plate;

said energy storage device comprises a membrane spring; and said membrane spring is disposed between said pressure plate and said clutch housing.

17. The friction clutch according to claim 16, wherein said two ring-shaped members are disposed between said membrane spring and said pressure plate;

said two ring-shaped members each comprise an inner surface and an outer surface;

each of said inner and outer surfaces of said two ring-shaped members extend substantially parallel to the axis of rotation;

said outer surfaces of said two ring-shaped members are disposed radially outward from said inner surfaces of said two ring-shaped members;

said plurality of pins comprises one of the following A), B) and C)

A) each of said plurality of pins is disposed adjacent said outer surfaces of said two ring-shaped; and each of said plurality of pins is disposed radially outward of said outer surfaces of said two ring-shaped members; and B) each of said plurality of pins is disposed adjacent said inner surfaces of said two ring-shaped members; and each of said plurality of pins is disposed radially inward of said inner surfaces of said two ring-shaped members; and C) said plurality of pins comprises at least one outer pin;

said at least one outer pin is disposed adjacent said outer surfaces of said two ring-shaped members;

said at least one outer pin is disposed radially outward of said outer surface of said two ring-shaped members;

said plurality of pins comprises at least one inner pin;

said at least one inner pin is disposed adjacent said inner surface of said two ring-shaped members; and said at least one inner pin is disposed radially inward of said inner surface of said two ring-shaped members.

18. The friction clutch according to claim 17, wherein:

said two ring-shaped members comprise a first ring-shaped member and a second ring-shaped member;

said first ring-shaped member comprises at least one adjustment surface;

said second ring-shaped member comprises at least one additional adjustment surface;

said first and second ring-shaped members are disposed immediately adjacent to each another;

said at least one adjustment surface of said first ring-shaped member and said at least one additional adjustment surface of said second ring-shaped member extend circumferentially about the axis of rotation;

said two ring-shaped members together have a width defined substantially parallel with the axis of rotation;

said at least one adjustment surface of said first ring-shaped member is disposed to cooperatively contact said at least one additional adjustment surface of said second ring-shaped member to permit an increase in said width of said two ring-shaped members upon a relative rotation of said first ring-shaped member with respect to said second ring-shaped member;

said wear adjustment mechanism comprises at least one spring;

said at least one spring of said wear adjustment mechanism extends between and connects said pressure plate and said two ring-shaped members;

said at least one spring of said wear adjustment mechanism is disposed to urge said two ring-shaped members to rotate about the axis of rotation relative to said pressure plate to increase said width of said two ring-shaped members upon wear of said friction linings.

19. The friction clutch according to claim 18, wherein:

said at least one spring of said plurality of pin members has a longitudinal axis;

said at least one spring of said plurality of pin members comprises a first end portion and an axially opposite second end portion;

said at least one spring of said plurality of pin members comprises an intermediate portion;

said intermediate portion of said at least one spring is disposed between said first and second end portions of said at least one spring;

said at least one ring-shaped member comprises a hole;

said hole extends between said inner surface and said outer surface of said two ring-shaped members;

said first end portion of said at least one spring is hook-shaped;

said first end portion of said at least one spring extends through said hole to hook said first end portion of said at least one spring to said two ring-shaped members;

said second end portion of said at least one spring is attached to a corresponding pin of said plurality of pins; and said intermediate portion of said at least one spring is disposed radially inward of said inner surface of said two ring-shaped members.

20. The friction clutch according to claim 19, wherein:

said plurality of pins comprises one of B) and C);

said corresponding pin to which said second end portion of said at least one spring is attached is disposed radially inward of said inner surface of said at least one ring-shaped member;

said second end portion of said at least one spring comprises a plurality of coils;

said plurality of coils is disposed about said corresponding pin to attach said second end portion of said at least one spring to said corresponding pin; and said plurality of coils is disposed to support said two ring-shaped members.

21. The friction clutch according to claim 19, wherein:

said plurality of pins comprises one of B) and C);

said corresponding pin to which said second end portion of said at least one spring is attached is disposed radially inward of said inner surface of said two ring-shaped members;

said second end portion of said at least one spring is hook-shaped; and said second end portion of said at least one spring is hooked to said corresponding pin.

22. The friction clutch according to claim 19, wherein:

at least one of said two ring-shaped members and said pressure plate comprises a portion disposed to define a gap between said pressure plate and said two ring-shaped members;

said gap having a width dimension defined substantially parallel with the axis of rotation;

said corresponding pin comprises a portion disposed to extend through said gap;

said second end portion of said at least one spring is hook-shaped;

said second end portion of said at least one spring is disposed in said gap;

said second end portion of said at least one spring is disposed approximately parallel with said membrane spring; and said second end portion of said at least one spring is hooked to said portion of said corresponding pin.

* * * * *

UNITED STATES PATENT AND TRADEMARK OFFICE
CERTIFICATE OF CORRECTION

PATENT NO. : 5,884,741
DATED : March 23, 1999
INVENTOR(S) : Winfried BOKISCH, Achim LINK, and Reinhold WEIDINGER It is certified that error appears in the above-indentified patent and that said Letters Patent is hereby corrected as shown below:

```
     In column 5, line 5, after 'the', delete "sane"
and insert --same--.

In column 14, line 63, Claim 16, after 'claim',
delete "11 wherein" and insert --1, wherein:--.
```

Signed and Sealed this

Twenty-third Day of November, 1999

*Attest:*

Q. TODD DICKINSON

*Attesting Officer*     *Acting Commissioner of Patents and Trademarks*